United States Patent
Danilunas et al.

(10) Patent No.: US 6,263,320 B1
(45) Date of Patent: Jul. 17, 2001

(54) AUTOMOBILE ACQUISITION FINANCING METHOD AND DATA PROCESSING SYSTEM THEREFOR

(75) Inventors: Marija J Danilunas, London; Diana Soltmann, Andover, both of (GB)

(73) Assignee: Devonshire Promotions Limited, London (GB)

( * ) Notice: Subject to any disclaimer, the term of this patent is extended or adjusted under 35 U.S.C. 154(b) by 0 days.

(21) Appl. No.: 09/216,907

(22) Filed: Dec. 21, 1998

(51) Int. Cl.$^7$ .............................. G06F 15/21; G06F 15/02
(52) U.S. Cl. .................................................... 705/35
(58) Field of Search .................................. 705/35, 36, 38

(56) References Cited

U.S. PATENT DOCUMENTS

| | | | |
|---|---|---|---|
| 4,722,055 | * | 1/1988 | Roberts .................................. 705/36 |
| 4,736,294 | * | 4/1988 | Gill et al. ............................... 705/38 |
| 4,752,877 | * | 6/1988 | Roberts et al. ......................... 705/35 |
| 5,809,484 | * | 9/1998 | Mottola et al. ......................... 705/38 |
| 5,987,436 | * | 11/1999 | Halbrook ............................... 705/38 |

FOREIGN PATENT DOCUMENTS

2183376 * 6/1987 (GB) .............................. G06F/15/21
922036 * 12/1992 (WO) ............................. G06F/15/21

OTHER PUBLICATIONS

Rovira Charles Al Expert v5 n2 p23(3) "A Settling of Accounts" Feb, 1990.*

* cited by examiner

*Primary Examiner*—Vincent Millin
*Assistant Examiner*—Geoffrey Akers
(74) *Attorney, Agent, or Firm*—Wolf, Greenfield & Sacks, P.C.

(57) ABSTRACT

A method of financing the acquisition of an automobile, the method comprising the steps of: (a) from time to time establishing a list of a plurality of automobiles; and (b) selling at least one financial product to a person selected from the group consisting of a potential owner of an automobile on the list and a third party who identifies the potential owner as a beneficiary of the at least one financial product, the at least one financial product having a maturity date later than a date of sale thereof and the financial product having as a condition of sale the requirement for any proceeds thereof on maturity to be used to purchase an automobile then on the list. Preferably, the method further comprises the step of: (c) at the maturity date selling an automobile then on the list to the potential owner, the seller being selected from the group consisting of an automobile manufacturer, a dealer of an automobile manufacturer and an agent of an automobile manufacturer.

23 Claims, 1 Drawing Sheet

AUTOMOBILE ACQUISITION FINANCING METHOD AND DATA PROCESSING SYSTEM THEREFOR

BACKGROUND TO THE INVENTION

The present invention relates to a method of financing the acquisition of an automobile and to a data processing system for implementing such a method.

DESCRIPTION OF THE PRIOR ART

The purchase of an automobile, in particular a new automobile, constitutes a significant financial investment. Often, the purchase of an automobile represents the second biggest purchase of an individual after the purchase of real estate. A variety of different financial products exists to assist in the purchase of a vehicle. Typically, such financial products require the purchaser of the vehicle to pay back a loan or to lease the vehicle for a period of time after delivery has been taken of the vehicle. Such financial products do not facilitate a potential purchaser of an automobile to save in advance in order to fund the automobile purchase. This disadvantage is a particularly acute for younger purchasers, especially those in the 16 to 25 year old age group. Younger persons are likely to have difficulty entering a loan, lease or other finance agreement on an automobile. Accordingly, people in that age group often find it difficult to purchase a new automobile, or even a pre-owned automobile, meeting certain safety criteria and most particularly having the latest safety features, for example a driver's air bag, anti-lock brakes, etc.

As the number of automobiles on the roads increases, and as the number of younger people driving automobiles increases, there is a continuing growing need for young people to drive safe automobiles, and to be able to finance the purchase of such automobiles. Road traffic accidents amongst drivers of up to 25 years old have enormous socio-economic effects on both local communities and general resources. In some countries, automobiles account for 80% of deaths in the 17 to 25 year old age group. In some countries, the automobile constitutes the most likely instrument of death up to the age of 44. For example, sons in the age group 17 to 25 years old are nine times more likely to crash an automobile than their fathers. In some countries, drivers under the age of 21 are involved in around one quarter of the fatal road crashes occurring every year. Medical trauma as a result of automobile accidents primarily occurs to young people. This is a major cause for taking young people out of their productive years.

The average parent spends a significant sum bringing up children and parents are becoming more aware about the health and safety of their children. There is also a growing awareness of the importance of automobile crash performance and safety design in the purchase of automobiles by adults. However, when young people purchase automobiles, crash performance and safety design are unlikely to figure highly in the purchase decision. Often the first automobile purchased by a young person is an older pre-owned vehicle without the latest safety features. Such a purchase decision is typically made not only because of the unavailability of finance but also because of the relative unimportance placed on safety by the young person.

There is thus a need in the art for a method for permitting potential owners of automobiles, in particular young people, to be able to acquire new automobiles which are likely to be more safe than pre-owned vehicles, and most particularly have a high safety specification. There is also a need in the art for financial products directed specifically at the acquisition of new automobiles by or for younger persons to enable new automobiles to be more affordable for younger persons.

SUMMARY OF THE INVENTION

Accordingly, the present invention provides a method of financing the acquisition of an automobile, the method comprising the steps of: (a) from time to time establishing a list of a plurality of automobiles; and (b) selling at least one financial product to a person selected from the group consisting of a potential owner of an automobile on the list and a third party who identifies the potential owner as a beneficiary of the at least one financial product, the at least one financial product having a maturity date later than a date of sale thereof and the financial product having as a condition of sale the requirement for any proceeds thereof on maturity to be used to purchase an automobile then on the list.

Preferably, the method further comprises the step of: (c) at the maturity date selling an automobile then on the list to the potential owner, the seller being selected from the group consisting of an automobile manufacturer, a dealer of an automobile manufacturer and an agent of an automobile manufacturer.

In accordance with the preferred method a purchase scheme and discount club is established to facilitate the acquisition of safe automobiles by or for persons typically in the 16 to 25 years' age range. The members of the club, who are held on a computer database, may comprise the potential owners and the third parties to whom the financial products are sold.

The list may be held on a computer database. The list may be updated with newer and/or safer models on a periodic basis, for example annually. Models which are on the list but have been discontinued by the manufacturer may be deleted automatically from the list.

Preferably, the list is administered by an administrator which is independent of any particular automobile manufacturer. The list may be established by the administrator or by a third party organisation. The administrator may be a club or association for automobile owners and/or drivers. The third party organisation may be a governmental organisation or agency, for example a government department responsible for automobile safety, or a non-governmental organisation or agency, such as a consumers' organisation or an automobile testing organisation. The third party organisation may alternatively be a trade association of automobile manufacturers.

The administrator may sell financial products direct to the said person. Alternatively, the administrator may authorise at least one financial products provider to sell financial products to the said person. The financial products may be sold through third party agents of the administrator and/or of the financial services provider. The financial products may comprise insurance policies, investments, saving schemes, mutual funds, stocks and/or bonds. The financial products may be funded through a lump sum payment and/or periodic payments, such as monthly premiums.

The administrator may also sell other financial products and/or other services, or may authorise the sale of other financial products and other services, by third parties, to the said person. Those other financial products and services may be supplied at a price which is lower-than the price available to people other than those persons.

The automobile seller may provide to the administrator an undertaking to sell the automobile on the list at a price set by a predetermined formula, for example a pre-set percentage or dollar amount discount on the manufacturer's recommended or normal retail price for the automobile at the maturity date.

DETAILED DESCRIPTION OF THE PREFERRED EMBODIMENTS

Figure 1:
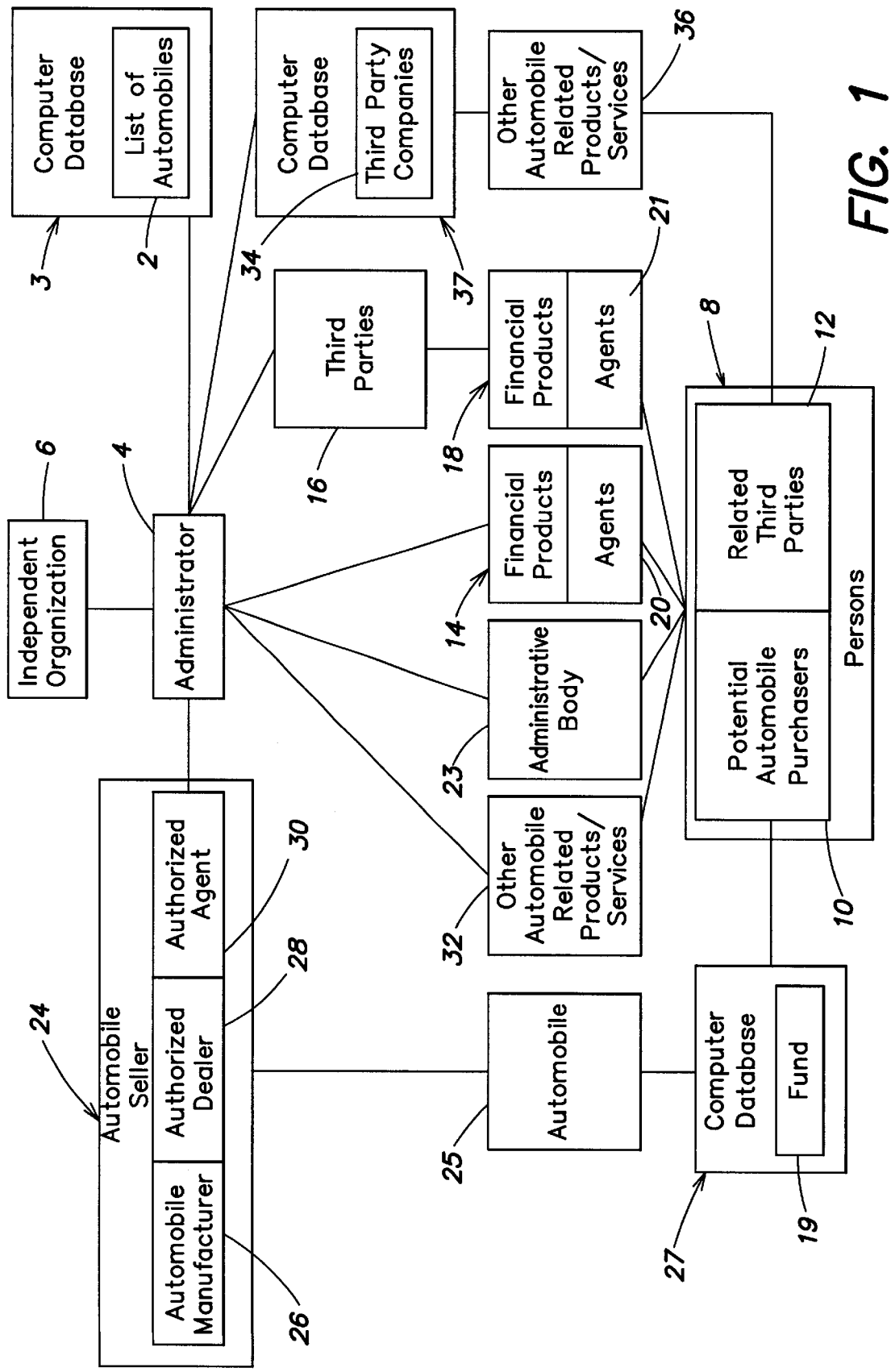
FIG. 1 is a block diagram representing a method of financing the purchase of an automobile in accordance with an embodiment of the invention.

Referring to FIG. 1, in accordance with the method of the invention a list 2 of automobiles meeting safety performance, and also optionally cost, criteria is established. The list is held on a computer database 3 for processing and storing data. The list 2 constitutes a table of safe cars which at any given time would include a number of different automobile models available from a variety of different automobile manufacturers. Typically, the list 2 would comprise automobile models from ten manufacturers of basic or family automobiles together with models from three manufacturers of luxury automobiles. However, the list 2 may have a greater or smaller number of automobiles from more or fewer manufacturers. The list 2 may be updated with newer and/or safer models on a periodic basis, for example annually. Models which are on the list 2 but have been discontinued by the manufacturer may be deleted automatically from the list 2.

The list 2 is maintained and administered by an administrator 4 which is independent of any particular automobile manufacturer in order to establish and maintain credibility in an independent list 2 in the mind of potential purchasers. Typically, the administrator 4 is a club for automobile owners and drivers. The administrator 4 may however be a trade association of automobile manufacturers. The administrator 4 of the list 2 establishes and maintains the list 2 on the computer database 3 based on information on the cost and safety performance of automobiles. Typically, the information is received from an independent organisation 6. The independent organisation 6 may be a governmental or non-governmental agency or organisation, consumers' association or automobile testing organisation which is independent of any automobile manufacturers. The list 2 has a safety standard which is created by compiling an inventory of features which would tend to enhance the safety of young drivers. The list 2 is derived from the safety standard by periodic testing of automobiles to determine the extent to which they comply with the safety standard.

The administrator 4 provides that financial products and automobile-related products and services are supplied to persons designated generally as 8. The persons 8 may be a group of individuals or alternatively a club with individuals as members of the club. The group or club 8 is divided into potential automobile owners or purchasers 10 and/or a third parties 12 who are related to or otherwise personally associated with a respective potential automobile owner 10. For example, the third party 12 may be a parent or grandparent of the potential owner 10. In accordance with a particularly preferred embodiment, the potential owner 10 is up to 25 years old.

The administrator 4 may in one embodiment sell one or more financial products 14 directly to the persons 8. Additionally or alternatively the administrator 4 may licence one or more third parties 16 to sell one or more financial products 18 to the persons 8. In each case, the financial products 14,18 may include insurance policies, investments, saving schemes, mutual funds, stocks and/or bonds. The financial products 14,18 are paid into a fund 19 established under a financial product plan for the later purchase of an automobile. The fund 19 may be recorded on a computer database 27 for processing and storing data. Each financial product 14,18 is provided with a designated maturity date which is later than the date of sale thereof to the persons 8. Optionally, the financial products 14,18 are sold through agents 20,21 such as insurance brokers, independent financial advisors, accountants or retail outlets for financial products. The financial products may be purchased in a single initial lump sum payment, or periodic (i.e. monthly or annual) premiums, optionally in conjunction with an initial lump sum payment. A final "top up" lump sum payment may be made to ensure that the final value of the fund 19 is sufficient to purchase the desired automobile.

Each person 8 to whom the financial product 14,18 is sold is accordingly designated as an owner or policy holder of the financial product 14,18. The potential purchaser 10 of the automobile is either the owner or policy holder of the financial product 14,18, or alternatively is a named beneficiary of the financial product 14,18 which has been sold to the third party 12. When the persons 8 are constituted as a club 8, either the administrator 4 or a separate administrative body 23 licensed by the administrator 4 may provide the members of the club 8 with information and/or correspondence of interest to club members which relates to automobile products and services and to the administration and development of the club 8.

Each financial product 14,18 has as a condition of sale thereof (as a contractual term or condition either in a main contract or in an accompanying rider or supplementary contract) the requirement for any proceeds of the financial product 14,18 on maturity at the maturity date to be used to purchase an automobile 25 which, at the maturity date, is on the list 2. However, a clause in the conditions of the financial product plan may provide that if the potential owner 10 is certified as being medically unfit to drive, then the fund 19 may be liquidated and used for other purposes. Alternatively, such a clause may provide for medical expenses.

Accordingly, at the maturity date the potential owner 10 of the automobile 25, who is either the owner of the financial products 14,18 or a named beneficiary of the financial products 14,18 under the policy, is required to purchase from an automobile seller 24 an automobile selected from the list 2. The automobile seller 24 may be constituted by an automobile manufacturer 26, an authorised dealer 28 of an automobile manufacturer or an authorised agent 30 of an automobile manufacturer. The automobile manufacturer 26, authorised dealer 28, or authorised agent 30 has previously undertaken to the administrator 4, either directly, or indirectly through the automobile manufacturer 26 in the case of an authorised dealer 28 or an authorised agent 30, to sell any automobile 25 on the list 2 at a purchase price which is lower than a price available to people other than persons 8. Thus the administrator 4 for the list 2, when establishing the list 2 and when adding new automobiles to the list 2 upon input from the independent organisation 6, receives from the automobile manufacturer 26, as a condition of the automobile manufacturer's vehicle going on the list 2, an agreement to sell vehicles at the respective maturity dates at a discount. The discount may be for example a pre-set percentage or dollar amount discount on the manufacturer's recommended or normal retail price for the automobile at the maturity date. In other words, the automobile manufacturer 26 sells automobiles 25 to members of the club 8 at pre-determined discounted prices which are not available to non-members. The automobile manufacturer 26 may also offer the purchaser discounts on other related goods and services provided by the manufacturer 26.

The administrator 4 may also sell at a discount directly to the persons 8 other automobile-related products and/or services 32. Additionally or alternatively the administrator 4 may licence third party companies 34 to sell other automobile-related products and/or services 36 to the persons 8. Details of the companies 34 may be recorded as data on a computer database 37 for processing and storing data, thereby establishing a discount supplier club. Such automobile-related products may comprise safety items such as childrens' car seats, harnesses and restraints, fire extinguishers and fire resistant rugs, or promotional goods such as toys, books, video cassettes, etc. The goods may also comprise life-style goods such as mobile phones, clothing, sunglasses, etc. The automobile-related products may, for example, also comprise products required for maintaining and running an automobile, for example tires, automobile spare parts, gasoline and motor oil. The automobile-related services may, for example, include garage works or services, driving lessons and safety checks. The services may, for example, also include automobile insurance, life insurance, travel insurance, and motor vehicle recovery services.

After purchase of the automobile 25, the owner 10 of the automobile 25 may continue to be a member of the club 8 and receive the discounted products and services 32,36. This is particularly important for younger drivers, for example up to 25 years old, since it improves access to safety products and services at lower cost than would otherwise be available.

The method of the invention has a number of benefits over known methods for financing the purchase of automobiles.

The method allows the purchaser to purchase an automobile which is a tangible, high value product with defrayed costs at a low price. The financing of the automobile may be established over a long period of time before actual purchase of the automobile. This enables an automobile to be purchased at a lower cost than is currently available for finance schemes established at the time of purchase of a vehicle. The financial product established to purchase the automobile may provide additional tax efficient savings.

The establishment of a list of safe cars in accordance with the invention also encourages persons to buy safer automobiles. Accordingly, at the maturity date the purchaser is able to buy an automobile having state of the art safety performance which is so essential to protect the inexperienced driver.

The method also provides to a purchaser of an automobile, financial savings on automobile-related products and services, particularly those related to safety. This is particularly important for young drivers.

The method also enables relatives, for example parents and grandparents, of young drivers or potential drivers to create a responsible and yet desirable gift for their children and grandchildren to facilitate the purchase of an automobile. This permits a saving scheme for an automobile to be established over a long period of time using money which otherwise would be spent on gifts which are often discarded or become worthless or obsolete. The method of the invention also enables purchasers, particularly young purchasers, to buy newer, safer cars. This is important for protecting the safety of inexperienced drivers. This in turn enables relatives of younger drivers, particularly parents and grandparents, to have piece of mind in that they have contributed financially to the purchase of a safe automobile for their offspring. The method may also provide mandatory driving classes for young drivers.

The method of the invention also has benefits for automobile manufacturers by establishing customer loyalty and tie-in to brands of potential purchasers at an early age. The establishment of a club of future automobile owners can provide for the automobile manufacturers, their dealers and agents, and other suppliers of automobile-related products and services, a ready-made mailing list which provides access not only to prospective automobile purchasers but also to their immediate family and friends. The establishment of a safe-automobile league gives an incentive to automobile manufacturers to design and sell safer automobiles, particularly for meeting the needs of younger drivers.

The inclusion of any given automobile in a "safe auto league" provides marketing benefits to the automobile manufacturer. The automobile manufacturers and suppliers of other automobile-related products and services, particularly those relating to safety, have an opportunity to develop further safety-related products and services for sale to members of the club. The establishment of a club of prospective automobile purchasers also provides the automobile manufacturer with a future order book extending over a long period of time. This enhances the value of a company and assists the projection of automobile sales into the future.

The preferred embodiments of the invention can provide a loyalty/safety generating, high profile, low cost, automobile saving scheme that appeals to a wide cross section of the population and provides a safe but attractive benefit to automobile drivers who are, for example, up to 25 years old.

What is claimed is:

1. A method of financing the acquisition of an automobile in a transaction between at least a first party and a second party, the method comprising the steps of:

a) from time to time the first party establishing a list of a plurality of automobiles, each of the plurality having a desired, predetermined property, and each of which are then available for purchase;

b) selling at least one financial product to the second party, who is a person selected from the group consisting of a potential owner of an automobile on the list and a third party who identifies the potential owner as a beneficiary of the at least one financial product, the at least one financial product having proceeds available to the potential owner at a maturity date later than a date of sale thereof; and c) requiring as a condition of selling the at least one financial product to the second party that the proceeds thereof on maturity be used to purchase for the potential owner an automobile then on the list.

2. A method according to claim 1 further comprising the step of:

(a) at the maturity date selling an automobile then on the list to the potential owner, the seller being selected from the group consisting of an automobile manufacturer, a dealer of an automobile manufacturer and an agent of an automobile manufacturer.

3. A method according to claim 1 wherein each automobile on the list meets at least one safety performance criterion.

4. The method according to claim 2 wherein in step (c) the automobile is sold at a purchase price which is lower than a price available to persons other than said persons to whom the at least one financial product has been sold.

5. A method according to claim 1 wherein the list is administered by an administrator which is independent of any particular automobile manufacturer.

6. A method according to claim 5 wherein the list is defined by the administrator.

7. A method according to claim 5 wherein the administrator is an association for automobile owners and drivers.

8. A method according to claim 5 wherein the list is defined by a third party organisation selected from a governmental organisation, a governmental agency, a government department responsible for automobile safety, a non-governmental organisation, a consumers' organisation and an automobile testing organisation.

9. A method according to claim 5 wherein the list is defined by a trade association of automobile manufacturers.

10. A method according to claim 5 wherein the administrator is the first party, who sells the financial products to the said person.

11. A method according to claim 5 wherein the administrator authorises at least one financial products provider as the first party to sell financial products to the said person.

12. A method according to claim 1 wherein the financial products are selected from at least one of insurance policies, investments, saving schemes, mutual funds, stocks and bonds.

13. A method according to claim 1 wherein the financial products are funded through at least one of a lump sum payment and periodic payments.

14. A method according to claim 5 wherein the administrator sells at least one other product to the said person.

15. A method according to claim 5 wherein the administrator authorises the sale of other financial products and other services, by third parties, to the said person.

16. A method according to claim 14 wherein the at least one other product is supplied at a price which is lower than the price available to people other than the said person.

17. A method according to claim 15 wherein the said other product and service is supplied at a price which is lower than the price available to people other than the said person.

18. A method according to claim 5 wherein the list is administered by an administrator which is independent of any particular automobile manufacturer and the automobile seller provides to the administrator an undertaking to sell the automobile on the list at the maturity date at a price set by a predetermined discount formula.

19. A method according to claim 18 wherein the formula is selected from a pre-set percentage discount and a dollar amount discount on the manufacturer's retail price for the automobile at the maturity date.

20. A method according to claim 1 further comprising establishing a club for potential owners and third parties to whom the financial products are sold.

21. A method according to claim 1 wherein the potential owner is not more than 25 years old at the maturity date.

22. A method according to claim 1 wherein automobiles included on the list satisfy a safety standard which is created by compiling an inventory of features for enhancing the safety of drivers.

23. A data processing system for performing the method of claim 1, the system comprising means for processing and storing data on the list of the plurality of automobiles and means for processing and storing data on funds of the potential owners and the third parties, each fund comprising the at least one financial product.

* * * * *